UNITED STATES PATENT OFFICE.

LEOPOLD SARASON, OF HIRSCHGARTEN, NEAR BERLIN, GERMANY.

PREPARATION FOR SLOWLY LIBERATING OXYGEN.

1,000,298. Specification of Letters Patent. Patented Aug. 8, 1911.

No Drawing. Application filed November 12, 1908. Serial No. 462,260.

*To all whom it may concern:*

Be it known that I, LEOPOLD SARASON, a subject of the German Emperor, residing at Hirschgarten, near Berlin, German Empire, have invented certain new and useful Improvements in Preparations for Slowly Liberating Oxygen, of which the following is a specification.

As is well known, hydrogen peroxid, sodium peroxid, sodium perborate, sodium percarbonate, and analogous preparations, liberate their loosely combined oxygen very readily if they come in contact with catalytic agents. They thus decompose to some extent even during storage, since particles of dust and the walls of the storage-vessels also act as catalytic substances. Also in their employment in medicine and hygiene, and in technical bleaching processes, premature and undesirable liberation of oxygen occurs, owing to the continual presence of catalytic substances. I have ascertained, however, that by the addition of pyrophosphates of the alkalis (especially sodium pyrophosphate), the keeping quality of the above-mentioned substances, both in dry form and in solution, can be considerably increased, in such manner that they are altered in a much lower degree by catalytic agents than when without such additions. Pyrophosphates, furthermore, essentially increase the stability of said oxygen-containing substances against the influence of heat. By means of the present invention, therefore, a much better economic exploitation of the oxygen at disposal can be effected.

A suitable preparation may be obtained by mixing, for instance, equal parts of sodium perborate ($Na_2B_4O_8+10H_2O$) and sodium pyrophosphate ($Na_4P_2O_7$).

The invention can be carried out in divers ways. For instance, the said additional substances, and the compounds containing loosely combined oxygen with which they are to be mixed, may be in a dry state. Or else the said additional substances, or the compounds, or both, may be in liquid form. Or solutions of the dry compounds containing loosely combined oxygen may be carefully crystallized in common with solutions of the said additional substances.

Having thus described my invention, I claim as new:—

1. A preparation for slowly liberating oxygen, consisting of a compound containing loosely combined oxygen, and an alkali pyrophosphate.

2. A preparation for slowly liberating oxygen, consisting of a compound containing loosely combined oxygen, and sodium pyrophosphate.

3. A preparation for slowly liberating oxygen, consisting of a compound containing loosely combined oxygen, and an alkali pyrophosphate, in a state of common crystallization.

4. A preparation for slowly liberating oxygen, consisting of a compound containing loosely combined oxygen in a dry state, and an alkali pyrophosphate in a dry state.

In testimony whereof I affix my signature in presence of two witnesses.

LEOPOLD SARASON.

Witnesses:
 LEOPOLD MATTAUSCH,
 ANTON HASSLER.